United States Patent
Knez et al.

(10) Patent No.: US 11,823,648 B2
(45) Date of Patent: Nov. 21, 2023

(54) ELECTRONIC DEVICE WITH FOVEATED DISPLAY SYSTEM

(71) Applicant: Apple Inc., Cupertino, CA (US)

(72) Inventors: Ivan Knez, San Jose, CA (US); Chun-Yao Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 399 days.

(21) Appl. No.: 17/111,177

(22) Filed: Dec. 3, 2020

(65) Prior Publication Data
US 2021/0090526 A1     Mar. 25, 2021

Related U.S. Application Data

(63) Continuation of application No. 16/477,155, filed as application No. PCT/US2018/014264 on Jan. 18, 2018, now Pat. No. 10,885,883.
(Continued)

(51) Int. Cl.
| | | |
|---|---|---|
| *G09G 5/391* | (2006.01) | |
| *G06F 3/01* | (2006.01) | |
| *G09G 3/20* | (2006.01) | |

(52) U.S. Cl.
CPC ............. *G09G 5/391* (2013.01); *G06F 3/013* (2013.01); *G09G 3/20* (2013.01); *G09G 2310/0291* (2013.01); *G09G 2310/0297* (2013.01); *G09G 2320/0261* (2013.01); *G09G 2340/0407* (2013.01); *G09G 2350/00* (2013.01); *G09G 2354/00* (2013.01)

(58) Field of Classification Search
CPC ........ G06F 3/013; G09G 3/20; G09G 3/2092; G09G 5/391; G09G 2310/027;
(Continued)

(56) References Cited

U.S. PATENT DOCUMENTS

| 3,778,811 A | 12/1973 | Gicca et al. |
| 4,874,164 A | 10/1989 | Miner et al. |
| (Continued) | | |

FOREIGN PATENT DOCUMENTS

| EP | 0363204 A2 | 4/1990 |
| GB | 2073997 A | 10/1981 |
| JP | 2000-67234 A | * 3/2000 |

OTHER PUBLICATIONS

Zou Yingyong, The High-Video Image Acquisition and Displaying System Based on CPLD Technology, Journal of Changchun University, Aug. 2006, pp. 40-43, vol. 16, No. 4, Changchun, Changchun University.

*Primary Examiner* — Stacy Khoo
(74) *Attorney, Agent, or Firm* — Treyz Law Group, P.C.; G. Victor Treyz; Joseph F. Guihan

(57) ABSTRACT

An electronic device may have a display. A gaze detection system may gather information on a user's point of gaze on the display. Based on the point-of-gaze information, control circuitry in the electronic device may produce image data for an image with areas of different resolutions. A full-resolution portion of the image may overlap the point of gaze. Lower resolution portions of the image may surround the full-resolution portion. The display may have a pixel array. The pixel array may include rows and columns of pixels. Data lines may be used to supply data to the columns of pixels in accordance with row selection signals supplied to the rows of pixels. Display driver circuitry may be used to display the image using the pixel array. The display driver circuitry may have row selection circuitry and column expander circuitry that are responsive to a resolution mode selection signal.

16 Claims, 12 Drawing Sheets

Related U.S. Application Data

(60) Provisional application No. 62/450,223, filed on Jan. 25, 2017.

(58) Field of Classification Search
CPC ... G09G 2310/0291; G09G 2310/0297; G09G 2320/0261; G09G 2340/0407; G09G 2350/00; G09G 2354/00; G09G 2360/08; G09G 2370/08
See application file for complete search history.

(56) References Cited

U.S. PATENT DOCUMENTS

| | | |
|---|---|---|
| 5,784,047 A | 7/1998 | Cahill, III et al. |
| 6,903,733 B1 | 6/2005 | Greenberg et al. |
| 9,316,834 B2 | 4/2016 | Makino et al. |
| 9,344,660 B2 | 5/2016 | Petilli |
| 10,152,122 B2 | 12/2018 | Klingström |
| 2001/0033287 A1 | 10/2001 | Naegle et al. |
| 2003/0222882 A1 | 12/2003 | Jeffrey et al. |
| 2004/0207635 A1 | 10/2004 | Miller et al. |
| 2006/0232541 A1 | 10/2006 | Kudo et al. |
| 2009/0141895 A1 | 6/2009 | Anderson et al. |
| 2010/0070942 A1 | 3/2010 | Madurawe |
| 2011/0234262 A1* | 9/2011 | Weng ............... G09G 3/3688 327/108 |
| 2013/0070109 A1 | 3/2013 | Gove et al. |
| 2016/0267713 A1 | 9/2016 | Patel |
| 2016/0350965 A1 | 12/2016 | Lum et al. |
| 2016/0379606 A1 | 12/2016 | Kollin et al. |

\* cited by examiner

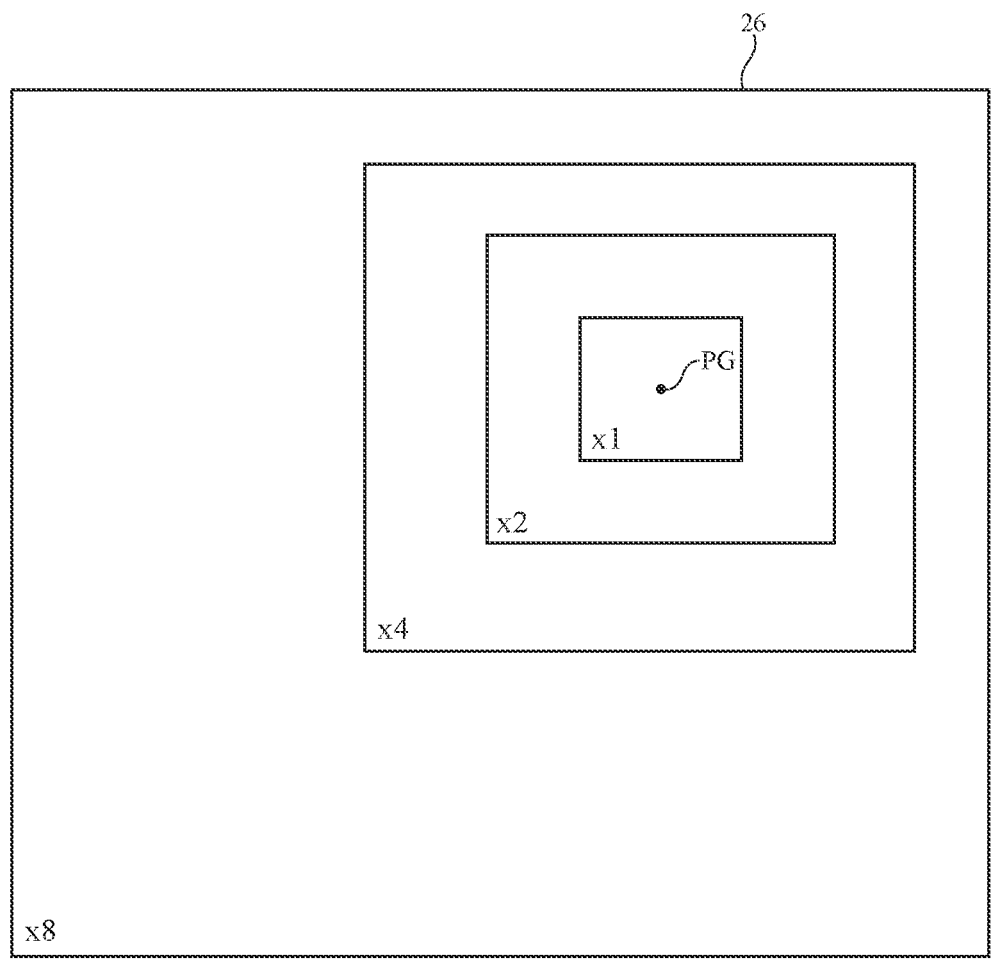
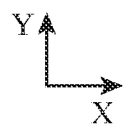
*FIG. 2*

Sel = 00, $t_{1-64}$ = $d_1$ $d_2$ ... $d_8$ 0 ... 0
Sel = 01, $t_{1-64}$ = $d_1$ $d_1$ $d_2$ $d_2$ ... $d_8$ $d_8$ 0 ... 0
Sel = 10, $t_{1-64}$ = $d_1$ $d_1$ $d_1$ $d_1$ $d_2$ $d_2$ $d_2$ $d_2$ ... $d_8$ $d_8$ $d_8$ $d_8$ 0 ... 0
Sel = 11, $t_{1-64}$ = $d_1$ $d_1$ $d_1$ $d_1$ $d_1$ $d_1$ $d_1$ $d_1$ $d_2$ $d_2$ $d_2$ $d_2$ $d_2$ $d_2$ $d_2$ $d_2$ ... $d_8$ $d_8$ $d_8$ $d_8$ $d_8$ $d_8$ $d_8$ $d_8$

*FIG. 8*

Mux Description

| Input $d_i d_j d_k d_l$ (ijkl) | Output $t_m$ (m) |
|---|---|
| 1111 | 1 |
| 1112 | 2 |
| 1123 | 3 |
| 1124 | 4 |
| 1235 | 5 |
| 1236 | 6 |
| 1247 | 7 |
| 1248 | 8 |
| 235x | 9, 10 |
| 236x | 11, 12 |
| 247x | 13, 14 |
| 248x | 15, 16 |
| 35xx | 17, 18, 19, 20 |
| 36xx | 21, 22, 23, 24 |
| 47xx | 25, 26, 27, 28 |
| 48xx | 29, 30, 31, 32 |
| 5xxx | 33, 34, ... 40 |
| 6xxx | 41, 42, ... 48 |
| 7xxx | 49, 50, ... 56 |
| 8xxx | 57, 58, ... 64 |

*FIG. 9*

ELECTRONIC DEVICE WITH FOVEATED DISPLAY SYSTEM

This patent application is a continuation of U.S. non-provisional patent application Ser. No. 16/477,155, filed Jul. 10, 2019, which is a 371 of PCT patent application No. PCT/US2018/014264, filed Jan. 18, 2018, which claims priority to provisional patent application No. 62/450,223, filed on Jan. 25, 2017, which are hereby incorporated by reference herein in their entireties.

BACKGROUND

This relates generally to devices with displays, and, more particularly, to devices with foveated displays.

Displays may be incorporated into devices such as head-mounted devices and other equipment. It may be desirable to provide users with immersive content using the display. For example, it may be desirable for a user's entire field-of-view to be filled with content on a display.

If care is not taken, however, images viewed by a user will not be satisfactory. High-resolution images may require excessive bandwidth and may therefore be difficult or impossible to display effectively at satisfactory frame rates. The bandwidth used in conveying image data to a display may be reduced by lowering image resolution, but excessively reduced image resolution may degrade image quality more than desired.

SUMMARY

An electronic device such as a head-mounted display or other display system may have a display. A gaze detection system may gather information on a user's point of gaze on the display. Based on the point-of-gaze information, control circuitry in the electronic device may produce image data for an image with multiple resolutions. A full-resolution area of the image overlaps the point of gaze. Lower resolution image areas are located in peripheral regions of the image.

The display has a pixel array. Display driver circuitry may be used to display the image using the pixel array. The pixel array may include rows and columns of pixels. Data lines may be used to supply data to columns of pixels in accordance with row selection signals supplied to rows of pixels.

The display driver circuitry may have row selection circuitry for supplying the row selection signals to the pixel array and may have column expander circuitry for routing data to the data lines of the pixel array. The row selection circuitry and column expander circuitry may be responsive to a resolution mode selection signal.

The column expander circuitry may have a bus-line buffer that receives the image data from the control circuitry on a first number of data input lines. The bus-line buffer may provide the received image data to an expanded number of bus-line buffer output lines. The column expander circuitry may also have a line buffer that receives the image data from the bus-line buffer output lines. The line buffer may supply image data to a third number of data lines in the pixel array.

BRIEF DESCRIPTION OF THE DRAWINGS

FIG. 2 is a diagram of an illustrative foveated display in accordance with an embodiment.

FIG. 8 is a diagram showing how data may be loaded depending on resolution operating mode in accordance with an embodiment.

FIG. 9 is a table showing how the inputs and outputs of the multiplexer circuitry of the bus-line buffer in the column expander circuitry of FIG. 7 may be configured in accordance with an embodiment.

DETAILED DESCRIPTION

Head-mounted displays and other devices may be used for virtual reality and augmented reality systems. These devices may include portable electronic devices such as cellular telephones, tablet computers, and other portable equipment, head-up displays in cockpits, vehicles, and other environments, projectors, and other equipment. Device configurations in which virtual reality and/or augmented reality content is provided to a user with a head-mounted display may sometimes be described herein as an example. This is, however, merely illustrative.

A head-mounted display such as a pair of augmented reality glasses that is worn on the head of a user may be used to provide a user with computer-generated content that is overlaid on top of real-world content. The real-world content may be viewed directly by a user (e.g., by observing real-world objects through an optical coupler in a display system that merges light from real-world objects with light from a display). Configurations in which images of real-world objects are captured by a forward-facing camera and displayed for a user on a display may also be used.

In electronic devices such as head-mounted display devices, it may be desirable to display images for users over a wide angle of view. Displays that cover wide angles of view at high resolutions may consume relatively large amounts of image data and may therefore impose bandwidth burdens on electronic devices such as head-mounted displays. These bandwidth burdens may be reduced by using a display scheme in which high resolution images are displayed in alignment with the user's current point of gaze and in which low resolution images are displayed in the user's peripheral vision. Display schemes such as these may sometimes be referred to as foveated display schemes.

Figure 1:
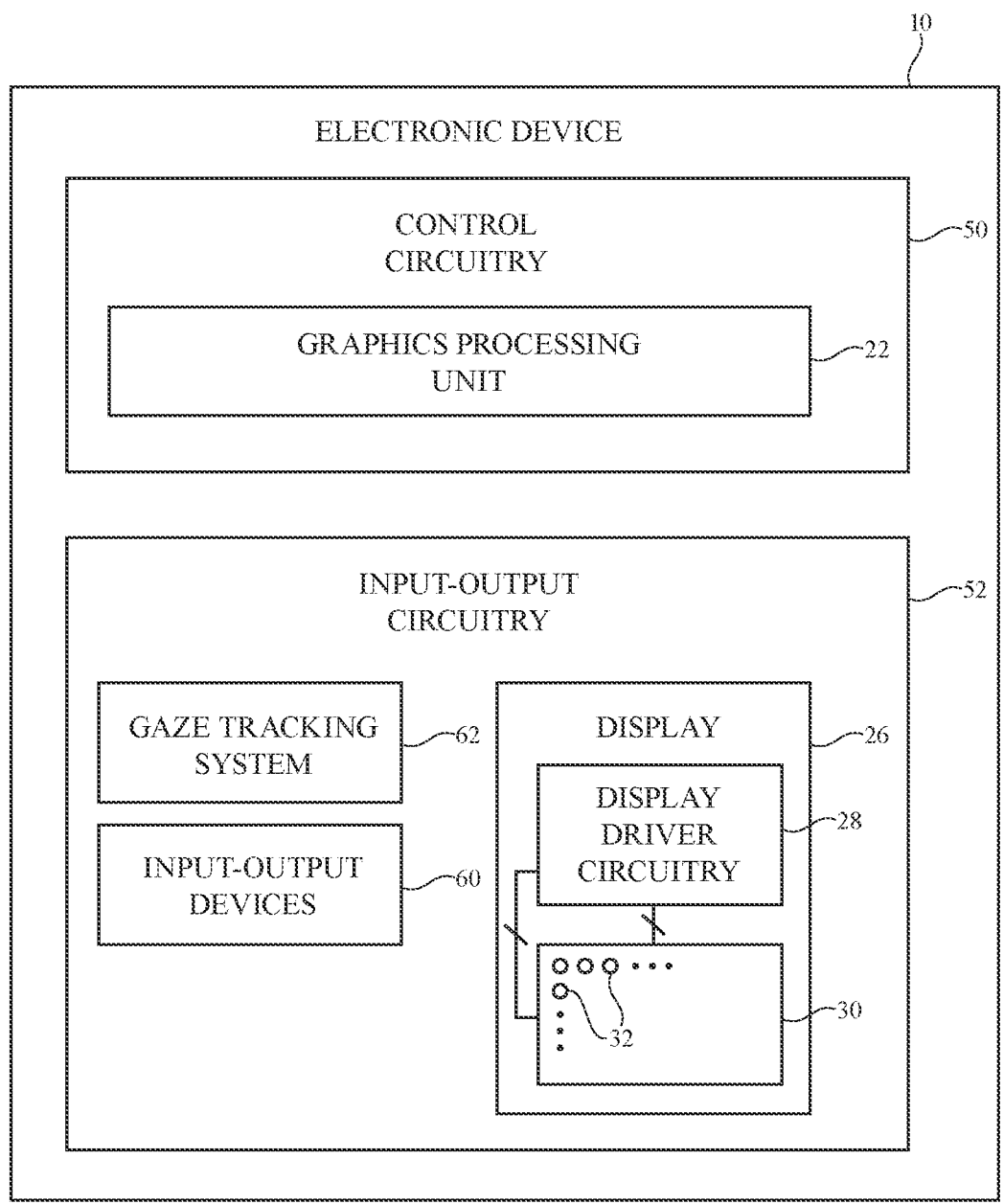
FIG. 1 is a schematic diagram of an illustrative electronic device such as a head-mounted display in accordance with an embodiment.

A schematic diagram of an illustrative head-mounted display or other electronic device of the type that may be provided with a foveated display arrangement is shown in FIG. 1. As shown in FIG. 1, electronic device 10 (e.g., a head-mounted display or other electronic device) may have control circuitry 50. Control circuitry 50 may include storage and processing circuitry for controlling the operation of electronic device 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units (e.g., graphics processing unit 22), application specific integrated circuits, and other integrated circuits. Software code may be stored on storage in circuitry 50 and run on processing circuitry in circuitry 50 to implement control operations for electronic device 10 (e.g., data gathering operations, operations involving the adjustment of components using control signals, etc.).

Electronic device 10 may include input-output circuitry 52. Input-output circuitry 52 may be used to allow data to be received by electronic device 10 from external equipment (e.g., a tethered computer, a portable device such as a handheld device or laptop computer, or other electrical equipment) and to allow a user to provide electronic device 10 with user input. Input-output circuitry 52 may also be used to gather information on the environment in which electronic device 10 is operating. Output components in circuitry 52 may allow electronic device 10 to provide a user with output and may be used to communicate with external electrical equipment.

As shown in FIG. 1, input-output circuitry 52 may include a display such as display 26. Display 26 may be used to display images for a user of a head-mounted display or other electronic device. Display 26 may, if desired, be incorporated into an optical coupler system that allows a user to observe real-world objects while computer-generated content is overlaid on top of the real-world objects by presenting computer-generated images on the display. A system of this type may be formed form a transparent pixel array (e.g., a transparent organic light-emitting diode display panel) or may be a formed by a display that provides images to a user through a beam splitter, holographic coupler, or other optical coupler (e.g., a display device such as a liquid crystal on silicon display).

Display 26 may have a pixel array such as pixel array 30 with pixels 32. Display driver circuitry 28 may receive image data from control circuitry 50 (e.g., images that have been rendered using graphics processing unit 22) and may use pixel array 30 to display the images. Display driver circuitry 28 may, for example, supply image data to columns of pixels 32 in pixel array 30 over respective data lines (e.g., data lines that run vertically through array 30 so that each data line supplies image data to a corresponding column of pixels 32) and may supply gate line signals (sometimes referred to as horizontal control signals, row selection signals, or control signals) to rows of pixels 32. When a given row selection signal is asserted, data may be loaded into the pixels 32 of that row from the data lines coupled to the pixels of that row.

In full-resolution image regions, each pixel 32 may be loaded with an individual bit of image data. In reduced-resolution image regions, image data bits may be expanded to cover multiple pixels. Data expansion may take place horizontally using column expander circuitry and vertically using row selection circuitry to simultaneously address multiple rows.

In general, display 26 may be any suitable type of display (e.g., a liquid crystal-on-silicon display, a light-emitting diode display in which pixels 32 are formed from crystalline semiconductor laser dies or organic light-emitting diodes, a liquid crystal display, a plasma display, a microelectromechanical systems display, or other suitable display). With one illustrative configuration, pixel array 30 is a liquid-crystal-on-silicon pixel array formed on a silicon substrate. Display driver circuitry 28 may be formed on the same silicon substrate or may be formed using one or more other silicon substrates.

Input-output circuitry 52 may include components such as input-output devices 60 for gathering data and user input and for supplying a user with output. Devices 60 may include cameras and other components that form part of gaze tracking system 62. The camera(s) or other components of system 62 may face a user's eyes and may track the user's gaze (e.g., images and other information captured by system 62 may be analyzed by control circuitry 50, circuitry 52, and/or circuitry in system 62 to determine the direction in which the user's eyes are oriented). This gaze information obtained by system 62 may be used to determine the location on pixel array 30 where the user's eyes are directed (sometimes referred to as the point of gaze of the user). If desired, system 62 may also gather information on the focus of the user's eyes and other information such as eye movement information. System 62 may sometimes be referred to as a gaze detection system, eye tracking system, gaze tracking system, or eye monitoring system. If desired, image sensors other than cameras (e.g., infrared and/or visible light-emitting diodes and light detectors, etc.) may be used in monitoring a user's gaze in system 62.

By determining the user's point of gaze, graphics processing unit 22 can expend processing effort on rendering the portion of the display where the point of gaze is located at full resolution, while rendering peripheral portions at one or more progressively lower resolutions. The portions of display 26 that are in a user's peripheral vision may be rendered with the lowest resolution and portions of display 26 that lie between the peripheral regions and the portion of display 26 that overlaps the user's point of gaze may be rendered with one or more intermediate levels of resolution.

During operation, control circuitry 50 and graphics processing unit 22 may obtain information on the location of the user's current point of gaze from gaze tracking system 62 and can render different portions of each image to be displayed accordingly. Images to be displayed on display 26 may, for example, be computer-generated content (e.g., augmented reality or virtual reality content from a game, navigation application, etc.). Before transmitting data for a given image to be displayed on display 26 from graphics processing unit 22 to display driver circuitry 28, graphics processing unit 22 can obtain the current point of gaze of the user from system 62 and can, based on this gaze information, render portions of the image that are nearest to the point of gaze with a higher resolution than portions of the image that are farther from the point of gaze (e.g., graphics processing unit 22 may produce foveated image data for display 26 based on point-of-gaze information received from gaze tracking system 62). This reduces the amount of bandwidth required to transmit data for the image from graphics processing unit 22 to display driver circuitry 28 of display 26. Once display driver circuitry 28 receives the foveated image data, display driver circuitry 28 can take appropriate action to display full resolution data in an appropriate full-resolution portion of pixel array 30 and to display one or more sets of lower resolution data in one or more respective lower-resolutions portions of pixel array 30.

An illustrative example of a foveated image being displayed on pixel array 30 of display 26 is shown in FIG. 2. In the example of FIG. 2, display 26 has a rectangular outline. The size of display 26 may be selected to be sufficiently large to cover most or all of a user's field of view. Based on gaze tracking information from gaze tracking system 62, graphics processing unit 22 may determine that a user's current point of gaze is located at point PG (e.g., in the upper right corner of display 26 in the example of FIG. 2). Based on this location, graphics processing unit 22 may render image data in full resolution for full-resolution area x1 of FIG. 2 (an area that overlaps PG). Peripheral image data (e.g., image data for region x8 of FIG. 2) may be rendered at a reduced resolution (e.g., ⅛ of the full resolution). Intermediate areas that lie between full resolution area x1 and reduced resolution area x8 may be rendered at ¼ resolution (see, e.g., the x4 area of display 26) and at ½ resolution (see, e.g., the x2 area of display 26). In general, any suitable number of different resolutions may be used in rendering image data for display 26 in device 10. The use of four different areas with four respective different resolutions in the example of FIG. 2 is illustrative.

As the user follows visible content on display 26, point-of-gaze location PG will shift to different regions on display 26. Graphics processing unit 22 may use this information to adjust the locations of the high resolution and lower resolution areas for which image data is being rendered with different resolutions. To ensure that display driver circuitry 28 is informed of which resolution applies in each portion of display 26 for a given image, graphics processing unit 22 and/or control circuitry 50 may supply display driver circuitry 28 with information on the boundaries of regions x8, x4, x2, and x1 (e.g., gaze tracking system information such as point of gaze PG or more processed information such as information on the boundary locations for regions x8, x4, x2, and x1 that is derived from point of gaze PG).

Figure 3:
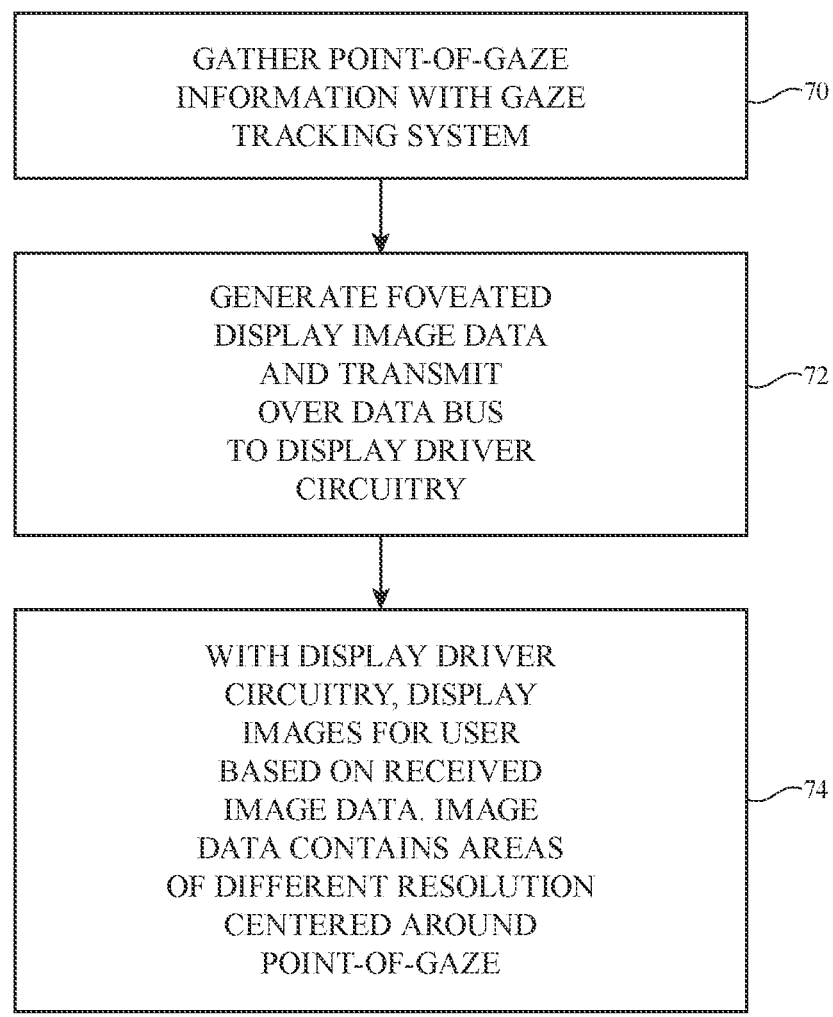
FIG. 3 is a flow chart of illustrative operations involved in operating an electronic device with a foveated display in accordance with an embodiment.

Illustrative operations involving operating device 10 are shown in FIG. 3.

During the operations of block 70, control circuitry 50 may use gaze tracking system 62 to gather information on the user's point-of-gaze. The point-of-gaze (see, e.g., point of gaze PG of FIG. 2) may be located at a particular coordinate (X,Y) on display 26. As the user's gaze moves (e.g., to track on-screen objects on display 26), the location of point of gaze PG can be updated dynamically.

A source of content (e.g., a computer program such as a game application or other application running on control circuitry 50) may produce content for viewing on display 26. To avoid overburdening the circuitry of device 10, graphics processing unit 22 may generate foveated display image data during the operations of block 72. The foveated data includes high resolution (full resolution) data for a full-resolution region of display 26 (e.g., the x1 region of FIG. 2) and image data of progressively lower resolutions for lower resolution regions (e.g., regions x2, x4, and x8 of FIG. 2). By rendering images with different resolutions in different areas, the amount of image data that is associated with the content to be displayed on display 26 can be significantly reduced (e.g., in comparison to rendering the entire image on display 26 at full resolution). This lowers the rendering burden on graphics processing unit 22 and lowers the amount of data bus bandwidth consumed in transferring the rendered image data from graphics processing unit 22 to display driver circuitry 28 over one or more data busses between graphics processing unit 22 and display driver circuitry 28.

During the operations of block 74, display driver circuitry 28 can expand compressed data and can provide pixels 32 of pixel array 30 with corresponding image data values and control signals to recreate a desired image. Column expansion circuitry may be used to load image data to the data lines of pixel array 30 (e.g., column expansion circuitry may route data from a relative small number of data input lines to a larger number of data lines). Row selection circuitry may be used to assert row selection signals for rows of pixels in pixel array 30 and thereby cause data on the data lines to be loaded into the pixels of selected row(s).

The image displayed on pixel array 30 (display 26) by display driver circuitry 28 contains regions of different resolutions (e.g., regions x1, x2, x4, and x8 of FIG. 2). Because high resolution content is centered about point of gaze PG, where the user's visual acuity is highest, the image will appear to be sharp (of high resolution) to the user, regardless of where the current point of gaze of the user is located. Peripheral portions of the user's vision will contain lower resolution content, but because the user's vision is less sensitive in those regions, there will be little or no impact on the user's perception of the resolution and quality of the displayed content.

Figure 4:
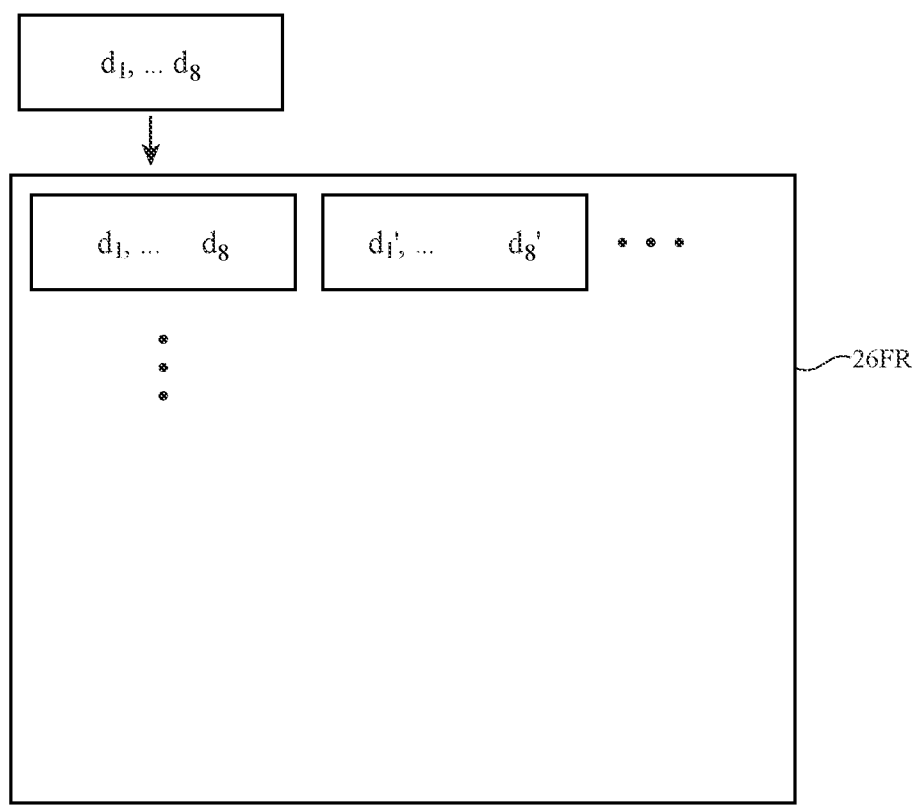
FIG. 4 is a diagram of an illustrative area of a display being loaded with image data in a full-resolution mode in accordance with an embodiment.

FIG. 4 is a diagram showing how display driver circuitry 28 may map incoming data to the pixels of an illustrative full-resolution portion 26FR of display 26 (e.g., region x1 of FIG. 2). Data may be received in 8-bit digital words (as an example). Incoming data words (e.g., a first word d1' . . . d8', a second word d1 . . . d8, etc.) may be loaded into the pixels of each row of display region 26FR in sequence as shown in FIG. 4 so that each pixel receives a unique data bit in full-resolution region 26FR.

Figure 5:
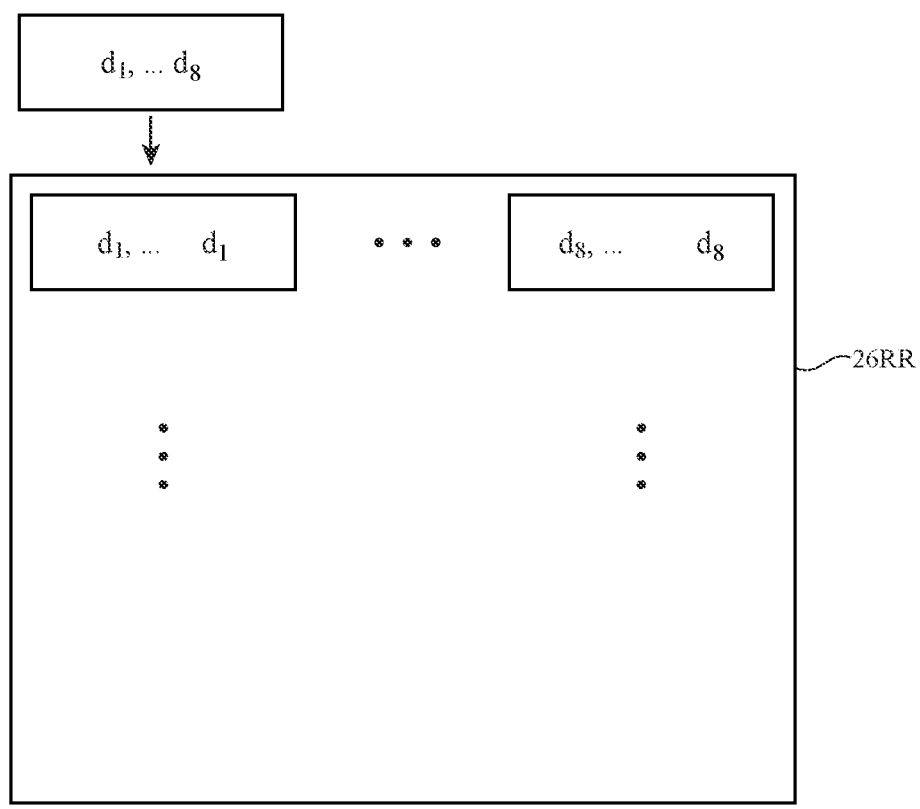
FIG. 5 is a diagram of an illustrative area of a display being loaded with reduced-resolution image data in accordance with an embodiment.

FIG. 5 is a diagram showing how display driver circuitry 28 may map incoming data of lower resolution (e.g., data with ⅛ of full resolution) to the pixels of an illustrative reduced-resolution portion 26RR of display 26 (e.g., a portion of region x8 of FIG. 2). As shown in FIG. 5, each incoming data word d1, d8 may be expanded, so that, for example, the first eight columns and first eight rows of region 26RR are provided with data bit value d1, the second eight columns and first eight rows of region 26RR are provided with data bit value d2, etc. Column expander circuitry can control the distribution of data bits horizontally (e.g., the distribution of a single bit b1 into 8 columns in the x8 FIG. 5 example). Row selection circuitry can control the distribution of data bits vertically (e.g., the distribution of a single bit b1 into 8 rows of a given column in a x8 configuration).

Figure 6:
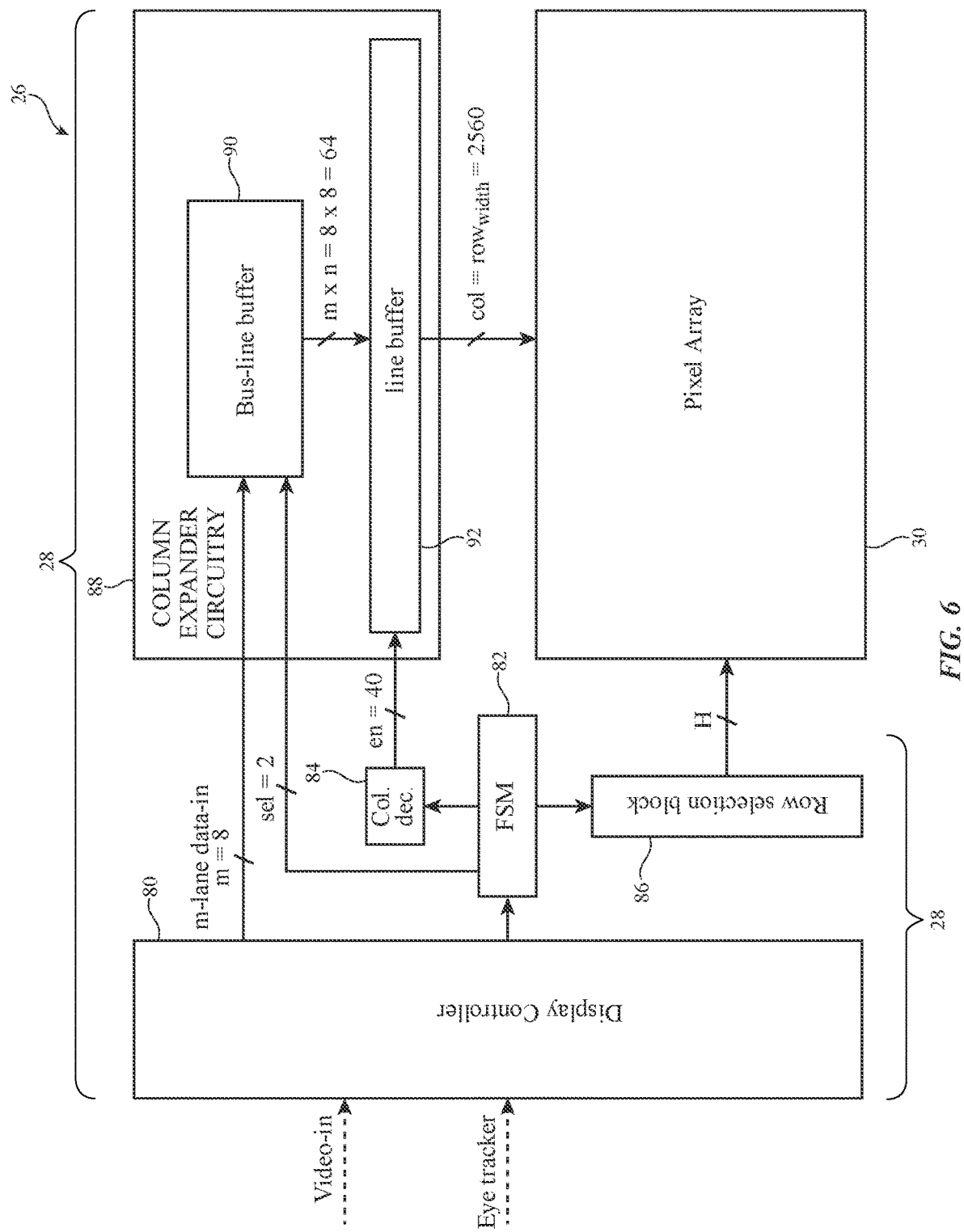
FIG. 6 is a diagram of a pixel array and associated display driver circuitry in accordance with an embodiment.

Illustrative display driver circuitry 28 and an illustrative pixel array 30 for display 26 are shown in FIG. 6. Pixel array 30 has an array (rows and columns) of pixels 32. Data lines (col) of FIG. 6 extend vertically through array 30. There may be a single data line associated with each column of pixels 32 (as an example). Row selection lines (e.g., H lines in FIG. 6) are coupled to the outputs of row selection circuitry 86 and receive row selection signals from circuitry 86. Each row selection line extends horizontally through a respective row of pixels 32 in array 30 and controls data loading from the data lines (col) to those pixels 32.

One or more data buses (serial and/or parallel) may be used to convey image data from an image data source in control circuitry 50 (e.g., graphics processing unit 22) to the "video-in" input of display controller 80. The "eye tracker" input to controller 80 may receive gaze tracking system information (e.g., the user's current point of gaze) or other information that allows display driver circuitry 28 to distinguish lower and higher resolution areas of an image from each other. The gaze tracking information (e.g., point of gaze) may be received from system 62 and/or control circuitry 50. The image data that is received at the video-in input has been foveated as described in connection with FIGS. 2, 3, 4, and 5, which reduces the bandwidth associated with conveying the image data across the data bus.

Display driver circuitry 28 may be implemented on a silicon substrate or other semiconductor substrate. If desired, pixel array 30 may be implemented on the same silicon substrate (e.g., in a configuration in which display 26 is a liquid-crystal-on-silicon display). Display driver circuitry 28 may include control circuitry such as finite state machine 82 and column decoder circuitry 84. (Circuits such as circuits 82 and 84 may, if desired, be formed as part of display controller 80.)

Finite state machine 82 may be used in providing control signals such as resolution mode selection signal se1 and column block enable signal en to column expander circuitry. The selection signal se1 may be used to place multiplexer circuitry in bus-line buffer 90 in different configurations depending on which resolution operating mode is desired. The column block enable signal en may be used to control a line buffer in bus-line buffer 90 (e.g., to select which block of columns in the line buffer is being loaded with data). The value of se1 (in the present example), can be 00 (for operation in full resolution mode), 01 for operation in ½ resolution mode, 10, for operation in ¼ resolution mode, or 11, for operation in ⅛ resolution mode.

Pixel array 30 may contain columns of pixels 32 arranged in a number of column blocks (e.g., 5 or more column blocks, at least 10 column blocks, at least 20 column blocks, at least 40 column blocks, etc.). As an example, pixel array 30 may contain 2560 columns arranged in 40 column blocks. The rows of array 30 may be asserted individually (for full resolution areas) or may be asserted in sets of two or more (e.g., sets of 8 rows may be asserted at the same time when loading data for ⅛ resolution areas). Column expander circuitry 88 may use bus-line buffer 90 to receive m lanes of input image data (data-in) and may provide correspondingly expanded set of columns of output (e.g., 64 columns=mxn, where m and n are equal to 8 in the present example) to line buffer 92. During operation, column decoder 84 may supply a signal en to line buffer 92 that informs line buffer 92 of which of the 40 column blocks of pixel array 30 is to receive the 64 columns of output of bus-line buffer 90. Row selection circuitry such as row selection block 86 may receive control signals from finite state machine 82 and may generate corresponding gate lines signals (horizontal control signals H) to load selected rows of pixels in pixel array 30 with data from line buffer 92.

Figure 7:
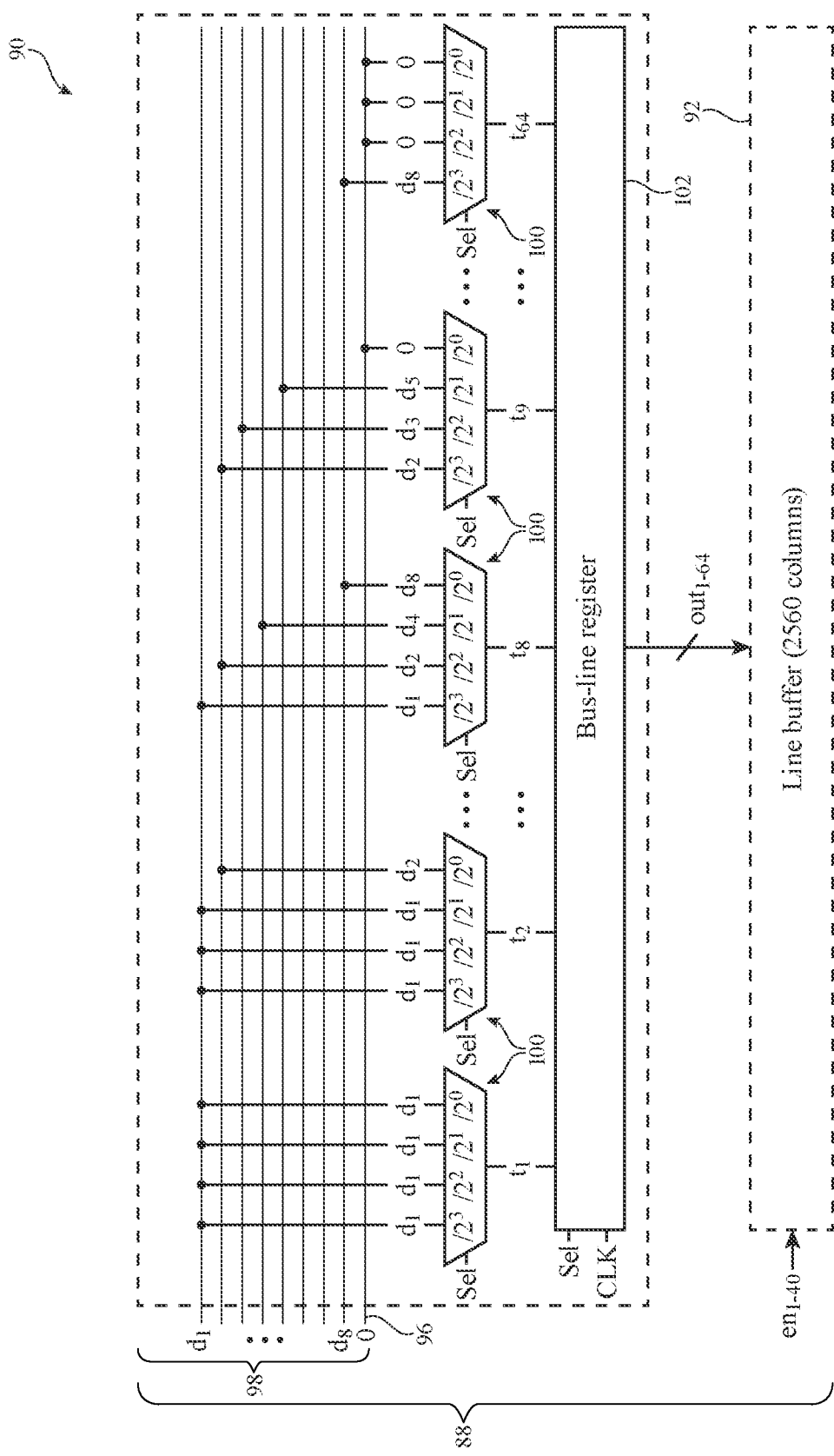
FIG. 7 is a diagram of illustrative column expander circuitry for a display driver circuit in accordance with an embodiment.

Illustrative column expander circuitry 88 is shown in FIG. 7. In the example of FIG. 7, column expander circuitry 88 is used to distribute image data that is received on 8 bus-line buffer input lines 98 to 2560 columns (data lines) in pixel array 30. Differently sized image data inputs and pixel arrays may be used, if desired.

As shown in FIG. 7, bus-line buffer input lines 98 may be provided with image data signals (e.g., bits d1 . . . d8) from display controller 80. Zero line 96 may be provided with a zero data value. Lines 98 and 96 in bus-line buffer 90 may be routed to the inputs of multiplexer circuitry such as bus-line-buffer multiplexers 100. Multiplexers 100 may supply their outputs t1 . . . t64 to bus-line register 102. An illustrative pattern that may be used for the input and output connections of bus-line buffer multiplexers 100 is given by the entries of the table of FIG. 9. The leading "1" of the first eight entries of the table of FIG. 9 indicate that bit d1 is routed to the first input of each of the first 8 multiplexers 100, etc. The corresponding bus-line-buffer multiplexer outputs tm for each of the 64 multiplexers 100 in buffer 90 are also specified by the rows of the table of FIG. 9.

Figure 10:
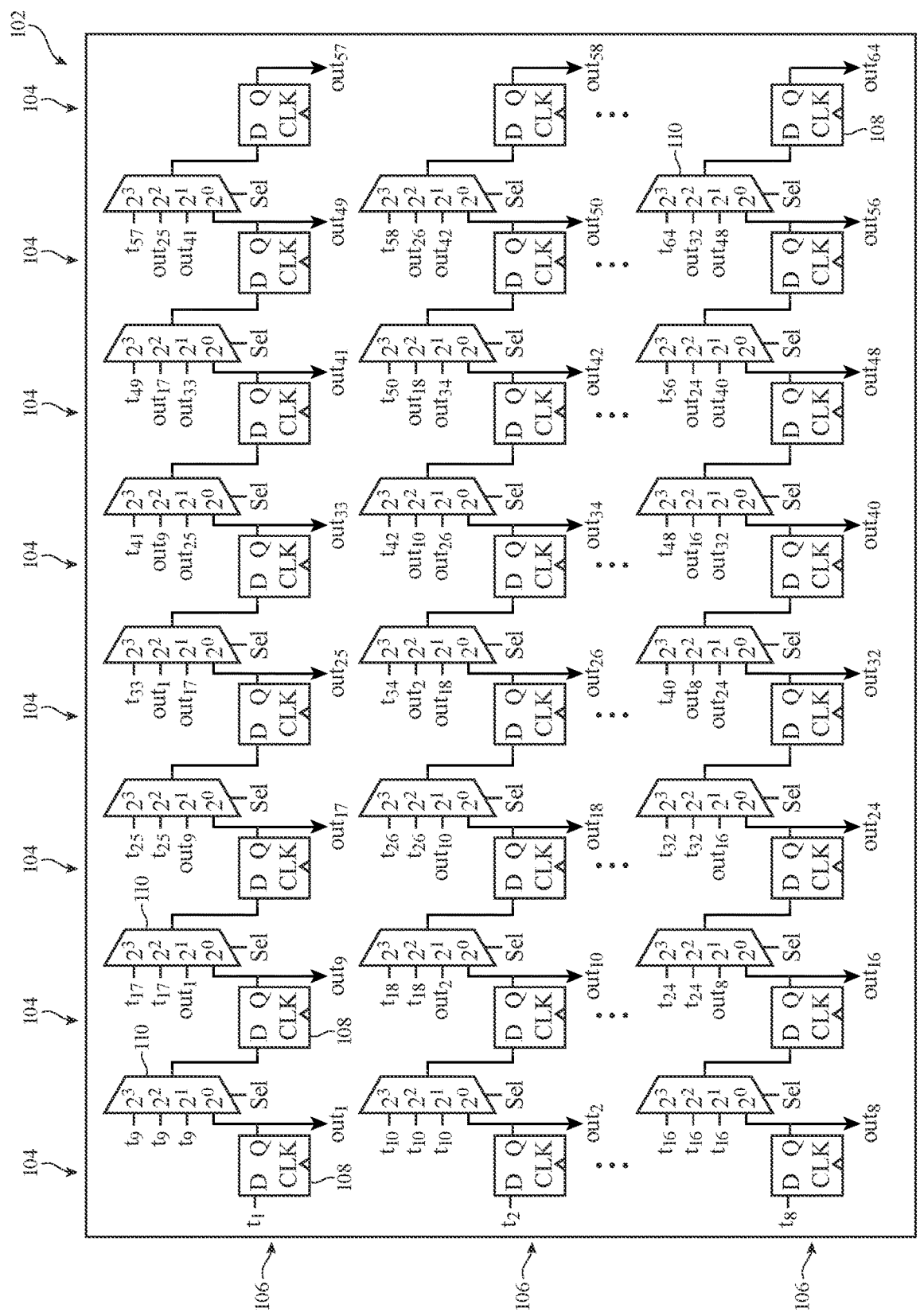
FIG. 10 is a circuit diagram of an illustrative bus-line register for the column expander circuitry of FIG. 7 in accordance with an embodiment.

Each multiplexer 100 may receive a control signal (resolution mode selection signal se1) from display controller circuitry such as finite state machine 82. Bus-line register 102 may also receive the resolution mode selection signal. The resolution mode selection signal se1 directs multiplexers 100 to route selected inputs (0, d1, . . . d8) to each bus-line-buffer multiplexer output (tm) in accordance with the current resolution mode (x1, x2, x4, or x8 in the present example). In bus-line register 102, the signal se1 controls the distribution of image data from multiplexer outputs t1-t64 to bus-line-register outputs out1-64, which serve as the outputs of bus-line buffer 90. Illustrative bus-line register circuitry 102 is shown in FIG. 10. Bus-line register 102 receives the outputs tm from multiplexer circuitry 100 and supplies corresponding output signals out1 . . . out64 to line buffer 92. Bus-line register 102 provides image data (outputs out1 . . . out64) to line buffer 92 in groups of 64 (sometimes referred to as column blocks). Bus-line register 102 loads and shifts data at each clock pulse CLK. As shown in FIG. 8, in native (full) resolution mode (se1=00), 8 data bits are loaded at an initial clock cycle CLK and serve as the leading 8 values of outputs t1 . . . t64. The remaining 64 outputs of register 102 are don't care outputs (e.g., these outputs may be set to zero as shown in FIG. 8). In the next increment of clock CLK (sometimes referred to as a pixel clock), the next 8 bits are loaded, etc. Eight clock cycles are therefore needed to fully load bus-line register 102 in full-resolution mode. Progressively smaller numbers of clock cycles are used in filling bus-line register 102 in lower resolution modes. It takes 8 clock cycles to fill bus-line register 102 in full-resolution mode (se1=00), it takes 4 clock cycles to fill bus line register 102 in ½ resolution mode (se1=10), it takes 2 clock cycles to fill bus-line register 102 in ¼ resolution mode (se1=10), and it takes 1 clock cycle to fill bus-line register 102 in ⅛ resolution mode (se1=11).

Illustrative bus-line register circuitry 102 is shown in FIG. 10. Register circuitry 102 may be operated in multiple modes corresponding to different resolutions (e.g., full resolution x1 mode, ½ resolution x2 mode, ¼ resolution x4 mode, and ⅛ resolution x8 mode in the present example). As shown in FIG. 10, circuitry 102 may include an array of registers 108 and multiplexers 110. Registers 108 may be controlled by clock signals CLK. Each multiplexer 110 may receive a respective se1 signal at its control input. Registers 108 of FIG. 10 have been arranged in 8 sets (columns) 104, each with eight rows 106. The outputs tm from multiplexer circuitry 100 of FIG. 7 are supplied to the inputs of registers 108 in the first column 104 of circuitry 102 and to the inputs of multiplexers 110. Outputs Q of registers 108 are used to supply 64 columns of output data out, to line buffer 92 of FIG. 7.

Figure 11:
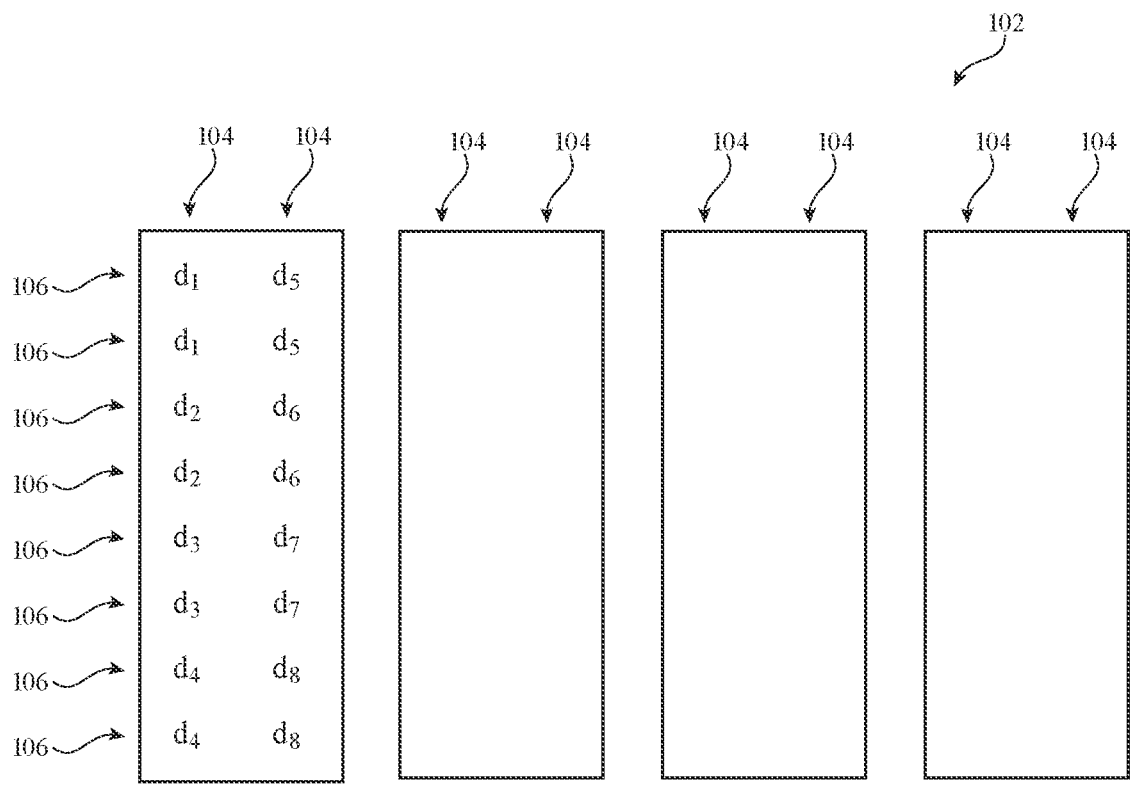
FIGS. 11 and 12 are diagrams showing how data may be loaded into the illustrative bus-line register of FIG. 10 during operation in a half-resolution mode in accordance with an embodiment.
Figure 12:
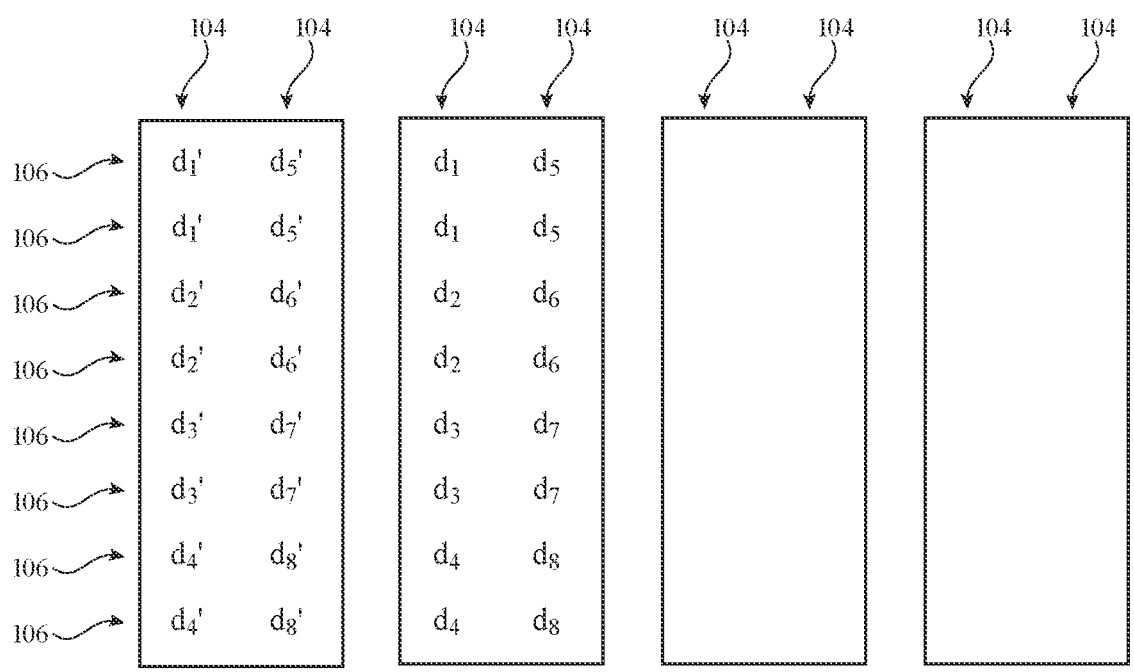

The se1 signal applied to circuitry 102 controls the distribution of image data to outputs out1 . . . out64. Consider, as an example, operation of circuitry 102 in x2 mode. The contents of registers 108 in this operating mode are illustrated in FIGS. 11 and 12. FIG. 11 shows operation of circuitry 102 on a first clock cycle. As shown in FIG. 11, during this first clock cycle, data bit d1 is loaded into the first two registers 108 in the first column 104, data bit d2 is loaded into the second two registers 108 in the first column 104, etc. and data bit d5 is loaded into the first two registers 108 of the second column 104, etc. Each data bit on one of lines 98 is expanded into two respective data bits in registers 108 due to the operation of circuitry 98 and 100 in the x2 mode. In the second clock cycle, the data loaded into registers 108 is shifted to the right by two columns and a new set of data (d1' . . . d8') is loaded into the first two columns of registers 108 as shown in FIG. 12. This loading and shifting process continues until circuitry 102 is fully loaded with ½ resolution data. Operations in x1 mode, x4, and x8 are the same, with correspondingly less or more data expansion by circuitry 98 and 100 prior to loading the data into registers 108.

Continuing with the x2 expansion example, FIG. 10 shows how the first column 104 in x2 mode receives d1, d1, d2, d2, d3, d3, d4, and d4 from outputs t1, t2, t8 of multiplexer circuitry 100. The second column in x2 mode receives data from outputs t9 . . . t16. During x2 mode, data d5 is routed to the first two multiplexers 110 coupled to the first two registers 108 in the second column by via outputs t9 and t10, respectively. As a result, d5 is loaded into the first two registers 108 in the second column. This pattern repeats over all of circuitry 102, thereby allowing data to be expanded in accordance with the current resolution operating mode (signal se1).

As an example, in x1 mode, the first clock cycle is used to load 8 unique bits d1, . . . d8 into the eight registers 108 of the first column 104. Eight clock cycles are therefore used to shift all of the data into circuitry 102 and thereby establish outputs out1 . . . out64.

As another example, in x8 mode, a single clock cycle is used to load all 64 of registers 108 and thereby establish outputs out1 . . . out64. During this clock cycle, data bit d1 is loaded into the eight registers 108 in the first of columns 104, data bit d2 is loaded into the eight registers 108 in the second of columns 104, . . . and data bit d8 is loaded into the eight registers 108 in the eighth of columns 104, thereby establishing outputs out1 . . . out8 are equal to d1, . . . , and outputs out57 . . . out64 are equal to d8.

Figure 13:
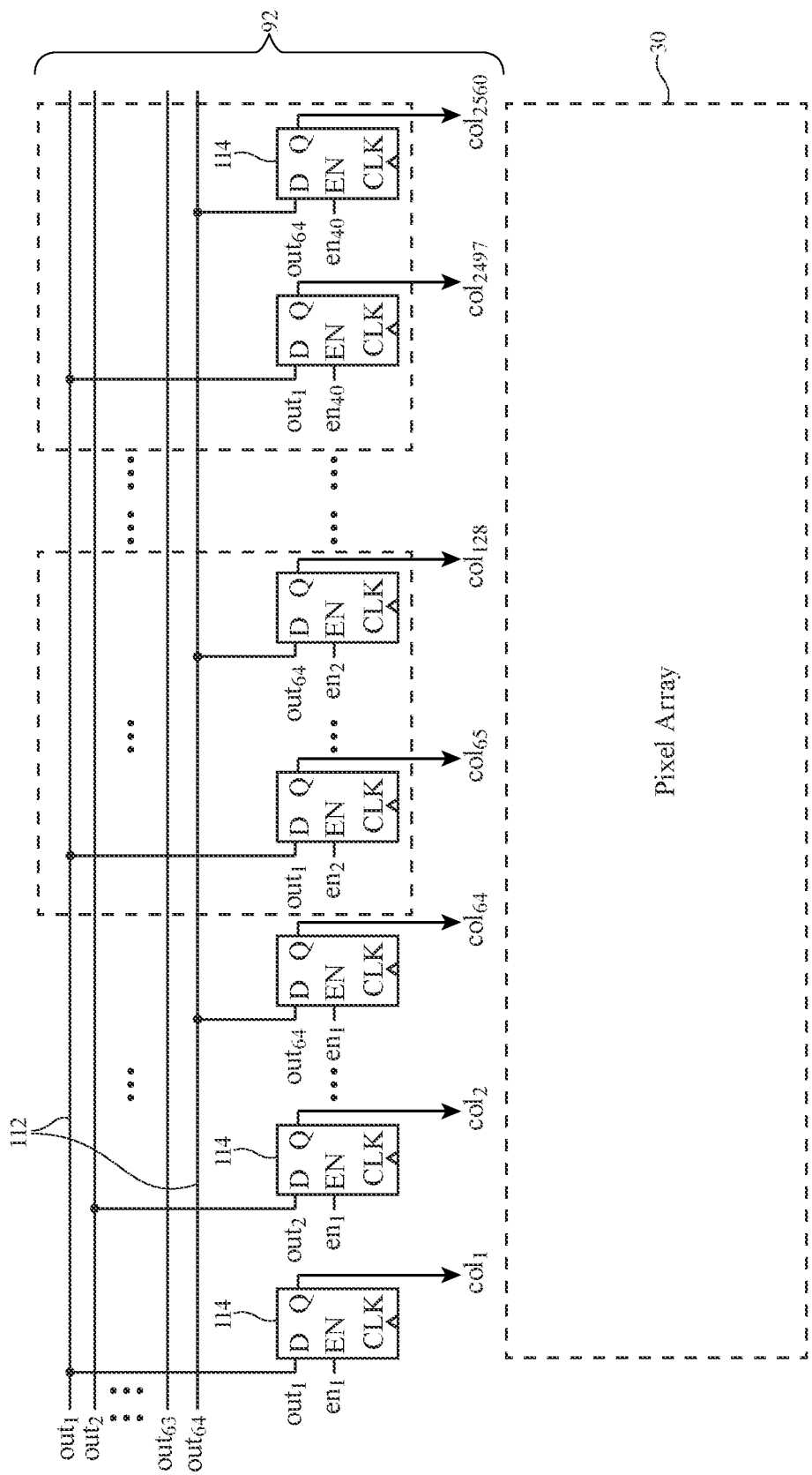
FIG. 13 is a circuit diagram of illustrative line buffer circuitry for the column expander circuitry of FIG. 7 in accordance with an embodiment.

FIG. 13 is a circuit diagram of illustrative line buffer circuitry 92 being used to distribute image data received from bus-line buffer outputs out1 . . . out64 (64 bit column blocks) to the columns (data lines) of pixel array 30 (col1 . . . col2560). As shown in FIG. 13, line buffer circuitry 92 may have routing lines 112. Routing lines 112 serve as line buffer inputs and receive the outputs from bus-line buffer 90. Routing lines 112 are coupled to line buffer registers 114 in a pattern that allows each column block to receive each of the 64 outputs out1 . . . out64. Registers 114 are controlled by enable signals en1 . . . en40. In this example, there are 40 column blocks with 64 registers 114 each, so each column block can be loaded by asserting an appropriate one of the 40 enable signals en1 . . . en40. If desired, line buffer circuitry 92 may be implemented using static random-access cells where bit-line data is received from out1 . . . out 64 while word-line select signals (en1 . . . en40) are received from display controller 80 (e.g., finite state machine 82 and column decoder logic 84). Logic 84 may generate the enable signals based on a 6-bit input from finite state machine 82.

The circuitry of FIG. 13 allows arbitrary column blocks to be addressed. This helps avoid sending repeated data into line buffer 92. For example, when in a x1 row, ⅛ resolution data need only be updated in the line buffer once every 8 lines, ½ resolution data need by updated in the line buffer only once every 4 lines, and ½ resolution data need only be updated once every 2 lines, while naturally native resolution data may be updated into the line buffer on every line.

Figure 14:
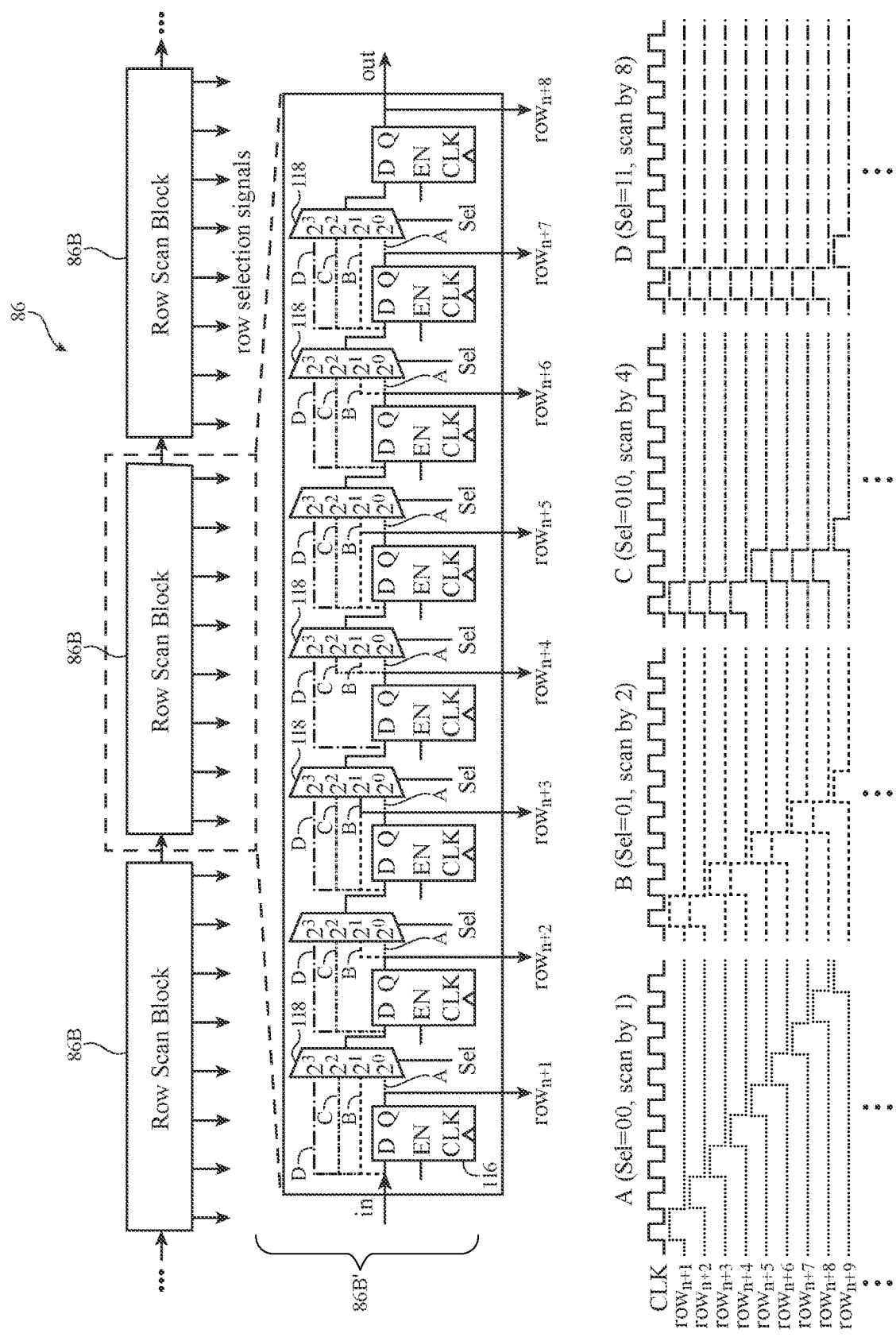
FIG. 14 is a diagram of illustrative row selection circuitry for display driver circuitry in accordance with an embodiment.

Illustrative row selection circuitry 86 is shown in FIG. 14. Row selection circuitry 86 may be formed from a set of row scan blocks 86B that supply row selection signals to the rows of pixels 32 in pixel array 30. The circuitry of an illustrative row selection block (illustrative block 86B') is shown in detail in FIG. 14. Block 86' may include a chain of row selection registers 116 that receive data on an input (input in), received from the previous block in the chain of blocks 86B forming circuitry 86) and that provide data on a corresponding output (output out, provided to the next block in the chain of blocks 86B forming circuitry 86). Enable signals en of registers 116 may be selectively asserted by finite state machine 82 when line buffer 92 is ready to load a given row. Resolution mode selection signal se1 may be used to configure multiplexers 118 for appropriate operation in each of the different resolution modes supported by display driver circuitry 28. In x1 mode (traces A of FIG. 14), each row signal is asserted in a separate clock cycle, so that full resolution data may be loaded into each row separately. In x2 mode (traces B of FIG. 14), each clock cycle is used to load data into a respective pair of rows. In x4 and x8 modes, four rows and eight rows may respectively be loaded with data from the data lines in pixel array 30 on each clock cycle.

In accordance with an embodiment, an electronic device is provided that includes a gaze tracking system configured to produce point of gaze information, control circuitry configured to produce image data associated with regions of an image of different resolutions based on the point of gaze information, a pixel array on which the image is displayed, the image includes a full-resolution region overlapping a point of gaze identified in the point of gaze information and includes multiple lower-resolution regions, and display driver circuitry configured to receive the image data from the control circuitry and configured to use the pixel array to display the image, the display driver circuitry includes, row selection circuitry configured to supply row selection signals to rows of pixels in the pixel array, and column expander circuitry coupled to data lines in the pixel array, the column expander circuitry includes a first buffer and a second buffer, the first buffer receives the image data on a first number of first buffer input lines and provides output signal to a second number of second buffer input lines, the second number is larger than the first number, the second buffer receives the output signal on the second number of second buffer input lines and provides data to a third number of pixel array data lines, and the third number is larger than the second number.

In accordance with another embodiment, the first buffer includes multiplexer circuitry that is configured to receive a resolution mode selection signal.

In accordance with another embodiment, the first buffer is a bus-line buffer includes a bus-line register that receives multiplexer output signals from the multiplexer circuitry.

In accordance with another embodiment, the bus-line buffer includes routing paths that distribute signals from the first buffer input lines to the multiplexer circuitry.

In accordance with another embodiment, the bus-line register has outputs that are coupled to the second buffer input lines.

In accordance with another embodiment, the bus-line register includes multiple sets of registers, and multiplexers having outputs coupled to inputs of at least some of the registers.

In accordance with another embodiment, the multiplexers of the bus-line register have at least some inputs that receive the multiplexer output signals from the multiplexer circuitry.

In accordance with another embodiment, the multiplexers of the bus-line register have at least some inputs that receive outputs from at least some of the multiplexers in the bus-line register.

In accordance with another embodiment, the display driver circuitry includes display controller circuitry configured to supply the resolution mode selection signal to the bus-line buffer.

In accordance with another embodiment, the multiplexer circuitry is configured to receive the resolution mode selection signal.

In accordance with another embodiment, the bus-line register is configured to receive the resolution mode selection signal.

In accordance with another embodiment, the multiplexers of the bus-line register are configured to receive the resolution mode selection signal.

In accordance with another embodiment, the row selection circuitry is configured to receive the resolution mode selection signal.

In accordance with another embodiment, the third number is at least 10 times larger than the second number.

In accordance with another embodiment, the second buffer includes a plurality of sets of registers, each set of registers containing the second number of registers, and each set of registers being configured to receive data from the second number of second buffer input lines when an associated enable signal for that set of registers is asserted.

In accordance with an embodiment, a display is provided that includes an array of pixels configured to display an image with regions of different resolutions, and display driver circuitry that includes, first circuitry configured to supply row selection signals to rows of pixels in the pixel array based at least partly on a resolution mode selection signal, and second circuitry configured to receive image data for the image, the second circuitry is coupled to data lines in the pixel array and distributes the received image data to the data lines based at least partly on the resolution mode selection signal, the second circuitry has a first buffer and a second buffer, the first buffer is configured to expand a first number of data input lines that receive the image data into a second number of first buffer output lines, the second buffer receives the image data from the second number of first buffer output lines and distributes the image data to a third number of the data lines in the pixel array, the third number is greater than the second number.

In accordance with another embodiment, the electronic device includes display controller circuitry configured to provide an enable signal to the second buffer, where the enable signal controls which of the data lines in the pixel receives the image data from the first buffer output lines.

In accordance with another embodiment, the second buffer includes multiplexers configured to receive the image data from the first buffer output lines.

In accordance with another embodiment, the second buffer includes registers that receive output from the multiplexers.

In accordance with an embodiment, an electronic device is provided that includes a pixel array configured to display an image that has areas of different resolutions, a gaze tracking system configured to produce point of gaze information associated with a point of gaze on the pixel array, control circuitry configured to produce image data for the image based on the point of gaze information, and display driver circuitry including, first circuitry that is controlled by a resolution mode selection signal and that produces row selection signals for rows of pixels in the pixel array, and second circuitry coupled to data lines in the pixel array, the second circuitry includes a first buffer and a second buffer, the first buffer provides image data received from the control circuitry on a first number of data input lines to a second number of output lines based on the resolution mode selection signal, the second buffer receives the second number of output lines and provides image data to a third number of data lines in the pixel array based on an enable signal, the second number is greater than the first number, and the third number is greater than the second number.

The foregoing is merely illustrative and various modifications can be made to the described embodiments. The foregoing embodiments may be implemented individually or in any combination.

What is claimed is:

1. A display, comprising:
an array of pixels configured to display an image with regions of different resolutions; and
display driver circuitry that includes:
first circuitry configured to supply row selection signals to rows of pixels in the array of pixels; and
second circuitry configured to receive image data for the image and distribute the received image data to data lines in the array of pixels, wherein the second circuitry comprises a first buffer with a first plurality of multiplexers and a second buffer with a second plurality of multiplexers and wherein the first plurality of multiplexers routes image data to the second buffer based on a resolution mode selection signal.

2. The display defined in claim 1, wherein the first buffer is configured to expand a first number of data input lines that receive the image data into a second number of first buffer output lines and wherein the second number is greater than the first number.

3. The display defined in claim 2, wherein the second buffer receives the image data from the second number of first buffer output lines and distributes the image data to the data lines in the array of pixels, wherein there are a third number of the data lines, and wherein the third number is greater than the second number.

4. The display defined in claim 3, wherein the third number is at least 10 times larger than the second number.

5. The display defined in claim 2, wherein the second plurality of multiplexers comprises a plurality of sets of multiplexers, each set of multiplexers containing the second number of multiplexers.

6. The display defined in claim 1, wherein the second buffer is configured to receive a control signal that identifies a target group of data lines for the image data received from the first buffer.

7. The display defined in claim 6, wherein the second buffer directs the image data received from the first buffer to the target group of data lines.

8. The display defined in claim 1, wherein the second plurality of multiplexers routes image data to the data lines based on the resolution mode selection signal.

9. The display defined in claim 1, wherein the resolution mode selection signal has two bits.

10. The display defined in claim 9, wherein the resolution mode selection signal has a first value for a full resolution mode, a second value for a ½ resolution mode, a third value for a ¼ resolution mode, and a fourth value for a ⅛ resolution mode.

11. The display defined in claim 1, wherein the second buffer comprises a plurality of registers and wherein each multiplexer in the second plurality of multiplexers has a corresponding register in the plurality of registers.

12. The display defined in claim 1, wherein the second buffer receives image data from the first buffer and distributes image data to the data lines in the array of pixels.

13. A display, comprising:
- an array of pixels configured to display an image with regions of different resolutions; and
- display driver circuitry that includes:
  - a plurality of data lines, wherein the plurality of data lines are arranged in a first number of column blocks, each column block including a subset of the plurality of data lines;
  - row selection circuitry configured to supply row selection signals to rows of pixels in the array of pixels; and
  - column expander circuitry comprising:
    - a first buffer that is configured to receive image data and provide an expanded set of image data, wherein the first buffer receives the image data over a second number of input lines and provides the expanded set of image data over a third number of output lines, wherein the third number is greater than the second number, wherein there are a fourth number of data lines, wherein the fourth number is greater than the third number, and wherein the first number multiplied by the third number is equal to the fourth number; and
    - a second buffer that is configured to direct the expanded set of image data to a selected one of the column blocks.

14. A display, comprising:
- an array of pixels configured to display an image with regions of different resolutions; and
- display driver circuitry that includes:
  - a plurality of data lines;
  - first circuitry configured to supply row selection signals to rows of pixels in the array of pixels based on a resolution mode selection signal; and
  - second circuitry comprising first and second buffers, wherein the first buffer receives the resolution mode selection signal and routes image data to the second buffer based on the resolution mode selection signal and wherein the second buffer routes image data from the first buffer to the data lines.

15. The display defined in claim 14, wherein the resolution mode selection signal has at least four unique values each corresponding to a unique resolution mode.

16. The display defined in claim 14, wherein the first circuitry comprises a first plurality of multiplexers, wherein the first buffer compromises a second plurality of multiplexers, and wherein each multiplexer in the first and second pluralities of multiplexers receives the resolution mode selection signal.

* * * * *